(12) United States Patent
Chang et al.

(10) Patent No.: US 7,062,265 B1
(45) Date of Patent: Jun. 13, 2006

(54) ARCHITECTURE TO SUPPORT SERVICE FEATURES FOR WIRELESS CALLS IN A WIRELESS TELECOMMUNICATION SYSTEM

(75) Inventors: Young-fu Chang, Buffalo Grove, IL (US); Michael Francis Dolan, Bolingbrook, IL (US); Chung-Zin Liu, Naperville, IL (US); John P. Menard, Naperville, IL (US); Milo Orsic, Lincolnwood, IL (US); Jin Yang, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 577 days.

(21) Appl. No.: 09/587,732

(22) Filed: Jun. 5, 2000

Related U.S. Application Data

(60) Provisional application No. 60/148,539, filed on Aug. 12, 1999.

(51) Int. Cl.
*H04Q 7/20* (2006.01)
*H04Q 7/38* (2006.01)

(52) U.S. Cl. .............. 455/426.1; 455/414.1; 455/432.1; 455/432.2; 455/433; 455/466; 455/422.1; 455/414.2; 370/352; 370/353; 370/354; 370/356; 709/203; 709/218; 709/219

(58) Field of Classification Search .......... 455/414, 455/422, 426, 432, 433, 415, 412, 445, 456, 455/517, 466, 403, 550, 552, 414.1, 414.2, 455/414.4, 422.1, 426.1, 426.2, 432.3, 435.1, 455/435.2, 500, 458, 550.1, 552.1; 370/352, 370/353, 354, 356; 709/203, 218, 219
See application file for complete search history.

(56) References Cited

U.S. PATENT DOCUMENTS

| | | | |
|---|---|---|---|
| 5,901,352 A | 5/1999 | St-Pierre et al. | 455/426 |
| 6,137,791 A * | 10/2000 | Frid et al. | 455/432 |
| 6,185,204 B1 * | 2/2001 | Voit | 455/422 |
| 6,224,477 B1 * | 5/2001 | Ho et al. | 455/422 |
| 6,304,753 B1 * | 10/2001 | Hartmaier | 455/414 |
| 6,438,383 B1 * | 8/2002 | Hall et al. | 455/458 |
| 6,519,242 B1 * | 2/2003 | Emery et al. | 455/433 |
| 2001/0043588 A1 * | 11/2001 | Sallberg | 455/426 |

FOREIGN PATENT DOCUMENTS

| | | |
|---|---|---|
| CA | 2 282 443 | 9/1998 |
| WO | WO 97/22209 | 6/1997 |

\* cited by examiner

*Primary Examiner*—Keith Ferguson

(57) ABSTRACT

An architecture to support service features for wireless calls in a wireless telecommunication system is disclosed. Service feature administration for a wireless terminal is provided by a packet data feature server in a home network that is connected to a packet data network. During call setup on behalf of the wireless terminal, the feature server is accessed via the packet data network to manage service features that are specific to the wireless terminal.

35 Claims, 3 Drawing Sheets

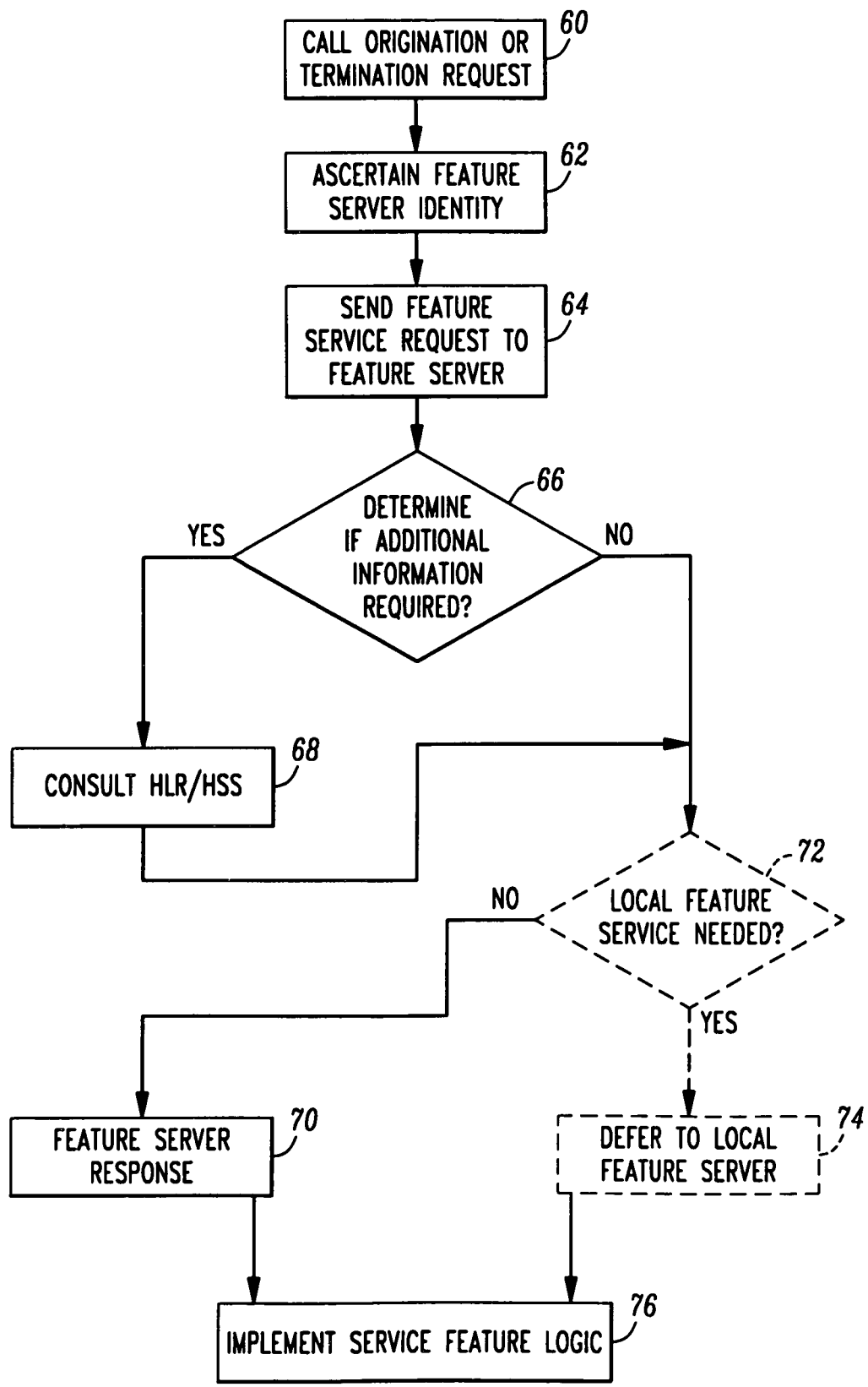

ARCHITECTURE TO SUPPORT SERVICE FEATURES FOR WIRELESS CALLS IN A WIRELESS TELECOMMUNICATION SYSTEM

CROSS-REFERENCE TO RELATED APPLICATIONS

This application is related to, and claims benefit of the filing date of, Provisional Application Ser. No. 60/148,539, entitled "Architecture To Support IP Based Multimedia Services In Wireless Roaming Environment," filed on Aug. 12, 1999.

STATEMENT REGARDING FEDERALLY SPONSORED RESEARCH OR DEVELOPMENT

Not Applicable

BACKGROUND OF THE INVENTION

1. Field of the Invention

This invention relates to wireless telecommunication systems. More particularly, the invention concerns the provision of service features for wireless calls in a wireless telecommunication system.

2. Description of the Prior Art

In existing wireless telecommunication systems, service features for wireless calls (e.g., call forwarding, call waiting) are implemented in an MSC (Mobile Switching Center). When a wireless subscriber roams beyond the jurisdiction of the subscriber's home MSC, a temporary subscriber database is created during the mobile registration process by the visited MSC. This database is part of a storage resource called the VLR (Visitors Location Register). The visited MSC creates the VLR database by querying an HLR (Home Location Register) associated with the subscriber's home network MSC, which reports the subscriber's service feature information back to the visited MSC. This service feature query interchange is supported by existing resources of the PSTN (Public Switched Telephone Network). Once a call is originated or terminated on behalf of the visiting wireless subscriber, call control logic in the VLR can be executed locally. However, frequent resynchronization between the VLR and the HLR may be required.

It is submitted that the administration of service features for wireless calls could be improved if the visited MSC did not have to re-create database information that already exists in the wireless subscriber's HLR. Among other things, eliminating this information re-creation step would tend to reduce registration-related delays. It is also noted that no basic or supplementary service features are typically available for wireless data calls in prior art systems. The above-described wireless service feature support is only provided in the voice domain, where separate bearer and signaling channels are used. A further deficiency of the prior art is that subscriber information stored in PSTN resources such as an HLR are generally available to the public. Service providers who wish to keep their subscriber information confidential thus cannot do so.

SUMMARY OF THE INVENTION

The foregoing problems are solved and an advance in the art is obtained by a novel system and method for providing service features for wireless calls in a wireless telecommunication system. In accordance with the system and method of the invention, access is made to a packet data network for administering service features for a wireless call to or from a wireless terminal. Access is additionally made to a home network for managing service features for the wireless call in a central location. The home network is connected to (or part of) the packet data network.

In preferred embodiments of the invention, a packet data feature server in the home network administers the service features for the wireless call. In some cases, the feature server may consult an HLR (or an HSS (Home Subscriber Server)) to obtain adjunct service feature information. In other cases, the feature server may pass service feature control (e.g., for emergency call or location service) to a local packet data feature server in the serving wireless network. These capabilities are preferably provided on a call-by-call basis to obviate the need for local feature information storage. The wireless call can be a voice call or a data call.

BRIEF DESCRIPTION OF THE DRAWING

The foregoing and other features and advantages of the invention will be apparent from the following more particular description of preferred embodiments of the invention, as illustrated in the accompanying Drawing, in which:

FIG. 3 is a flow diagram showing method steps performed in accordance with the invention.

DETAILED DESCRIPTION OF THE PREFERRED EMBODIMENT

Figure 1:
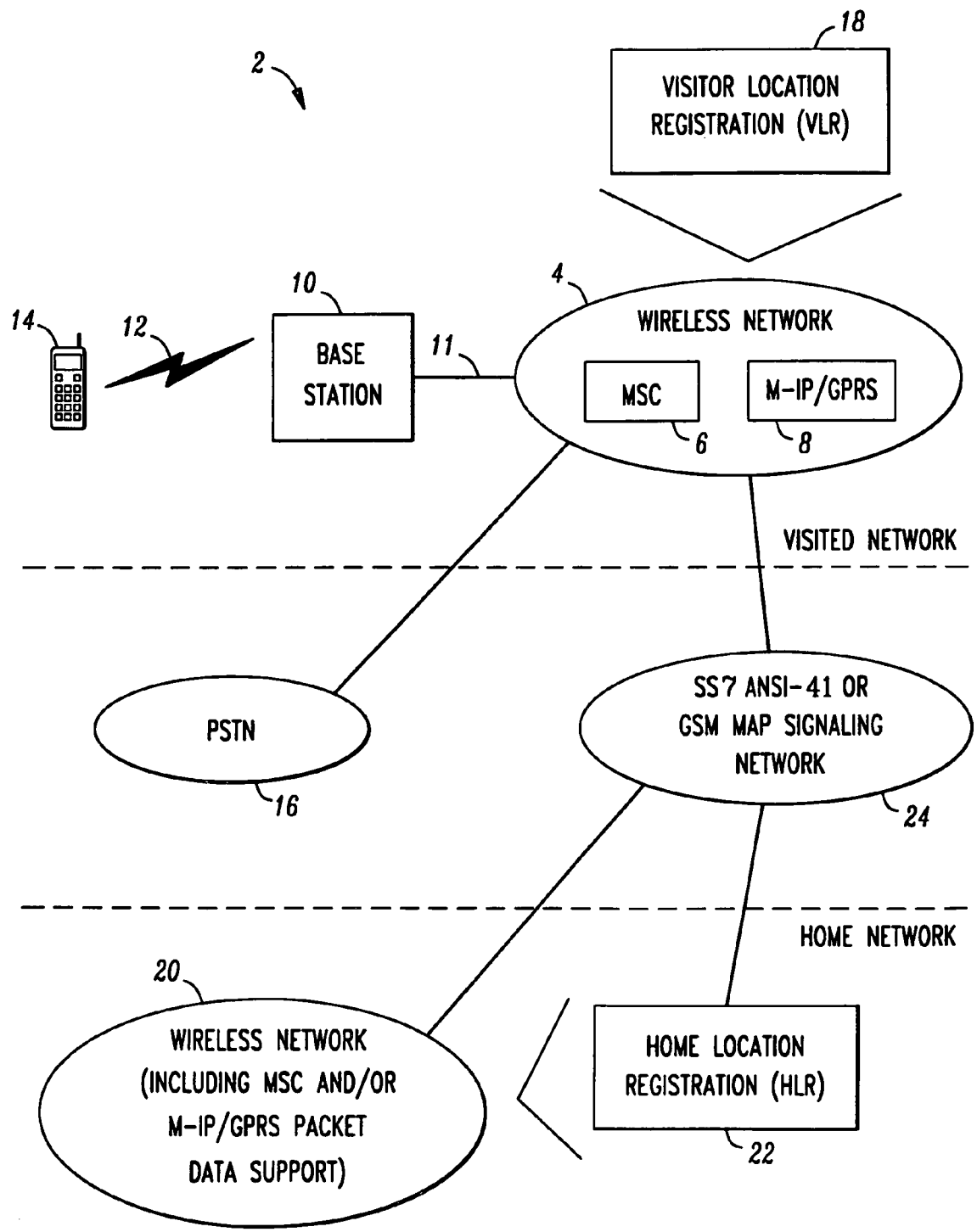
FIG. 1 is a block diagram showing relevant portions of a prior art wireless telecommunication system.

Turning now to the figures, wherein like reference numerals represent like elements in all of the several views, a prior art wireless telecommunication system will be described with reference to FIG. 1 in order to better illustrate the features of the present invention as described hereafter with reference to FIGS. 2 and 3. As shown in FIG. 1, the prior art wireless communication system 2 includes a wireless (access) network 4. The wireless network 4 includes an MSC 6 that supports voice calls on behalf of mobile terminals served by the network 4. In addition, or in the alternative, the wireless network 4 may include a M-IP (Mobile-Internet Protocol)/GPRS (Global Packet Radio Service) system 8 that supports data calls on behalf of mobile terminals served by the wireless network. As is known, the M-IP/GPRS system 8 would typically include an SGSN (Serving GPRS Support Node) and a GGSN (Gateway GPRS Support Node). Equivalently, a CDPD (Cellular Digital Packet Data) system could be used for data calls, as could any other suitable wireless data operations system. A base station 10 is connected via a conventional wireline communication link 11 to the MSC 6 and/or the M-IP/GPRS system 8, and communicates over an air interface 12 with a mobile terminal 14. The mobile terminal 14 includes a radio unit and either a mobile telephone, a mobile data terminal, or both. The mobile terminal 14 and the base station 10 are assumed to be equipped for 2G/3G ($2^{nd}$ Generation/$3^{rd}$ Generation) voice and/or data communication over the air interface 12.

As is well known in the art, the MSC 6 provides a switch by which mobile terminals in the wireless network access the PSTN (Public Switched Telephone Network) 16 for voice communication. Likewise, although not shown, the M-IP/GPRS system 8 acts as a switch/router providing a conventional gateway connection between mobile terminals in the wireless network 4 and a data network (not shown), such as the Internet. The MSC 6 and the M-IP/GPRS 8 each include conventional access manager functionality to support wireless mobility and radio access functions on behalf of their own mobile terminal subscribers. These functions are also provided on behalf of roaming mobile terminals traveling within the jurisdiction of the wireless network 32. In some implementations, the foregoing functions may be assisted by a base station controller (not shown). The MSC 6, but not the M-IP 8, also implements service features (e.g., call forwarding, call waiting, etc.) to both native and roaming mobile terminals. Assisting in the provision of service features to roaming mobile terminals is a VLR 18, which stores service feature information for retrieval by the MSC 6, as will now be described.

Assume that the mobile terminal 14 is visiting in the wireless network 4 (Visited Network) from a wireless network 20 (Home Network). When the mobile terminal 14 registers in the wireless network 4, the MSC 6 sends a service feature request inquiry to the wireless terminal's HLR 22 requesting, among other things, service feature information associated with the wireless terminal. This inquiry is conventionally sent via a signaling network 24 operating according a protocol such as SS7 (Signaling System 7), ANSI-41, or GSM (Global System for Mobile communications) MAP (Mobile Application Part). The HLR 22 responds by returning service feature information associated with the wireless terminal 14. This information is stored in the VLR 18 of the wireless network 4, and is used by the MSC 6 to originate and terminate calls on behalf of the mobile terminal 14 for as long as the mobile terminal remains registered in the wireless network 4.

As indicated by way of background above, the foregoing roaming scenario can introduce registration delays because of the information exchange required between the mobile terminal's home wireless network 20 and the visited wireless network 4. There is also a need to create a VLR entry locally, and there can be a need to synchronize that entry with the home database (HLR) frequently. As further noted by way of background above, no basic or supplementary service features are typically available for wireless data calls in prior art systems. Unlike the voice domain, there are no separate channels for bearer traffic and signaling information in the data domain. Only data connections are provided.

Figure 2:
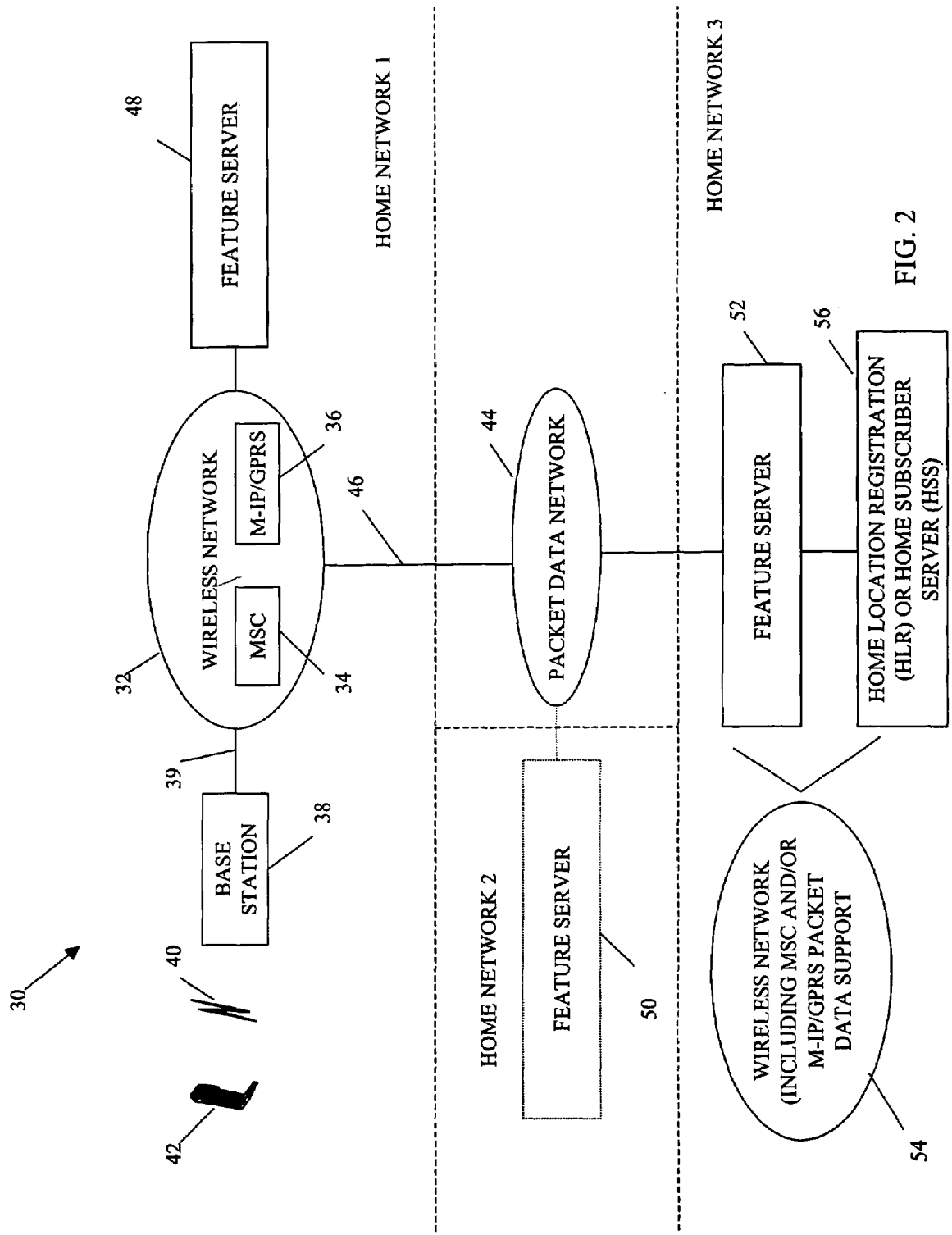
FIG. 2 is a block diagram showing an exemplary wireless telecommunication system implemented in accordance with the invention.

Turning now to FIG. 2, an improved system and method for providing service features for wireless calls in a wireless telecommunication system make use of the performance characteristics of modern packet data networks, which are continuing to improve. Summarizing in advance, when wireless voice or multimedia service features are introduced in a wireless telecommunication system, a packet data (e.g., IP- conversant) feature server (instead of an MSC) can be used to manage service feature functions based on service feature information and control logic stored therein for a mobile terminal involved in a call. Because of the improved performance of current packet data networks (e.g., implementing IP routing and/or ATM switching), it is possible to access the feature server on a call-by-call basis at a central location via the packet data network without using a VLR (regardless of the location of the mobile). This allows wireless service providers to manage nearly all service features for a given mobile subscriber from a single location, and to reduce operation costs with a simple architecture. As an additional advantage, by way of example only, a subscriber can be allowed to access the feature server and enter commands to configure a customized "virtual home service feature environment" for handling calls.

As shown in FIG. 2, a wireless communication system 30 in accordance with the invention comprises a wireless (access) network 32. The wireless network 32 includes an MSC 34 supporting voice communication and/or an M-IP/GPRS system 36 supporting packet data communication. Equivalently, a CDPD (Cellular Digital Packet Data) system could be used for data calls, as could any other suitable wireless data operations system. A base station 38 is connected via a conventional communication link 39 to the MSC 34 and/or the M-IP system 36, and communicates over an air interface 40 with a mobile terminal 42. The mobile terminal 42 is assumed to be identical in all respects to the mobile terminal 14 of FIG. 1, except that it is adapted to communicate signaling messages with the aforementioned feature server when required to do so during voice and data calls (described in more detail below). The MSC 34 and the M-IP/GPRS system 36 are also preferably identical to the MSC 6 and the M- IP/GPRS system 8 of FIG. 1, except that (1) they are both adapted for data communication (e.g., using the TCP/IP protocol) with a packet data network 44 (via data link 46), and (2) neither the MSC 6 nor the M-IP/GPRS system 8 administer service features on behalf of mobile subscribers. That function is provided under the control of a packet data feature server, which implements service feature logic on behalf of the mobile terminal 42. As described in more detail below, the feature server implements service features on behalf of both native mobile subscribers as well as roaming mobile terminals traveling within the jurisdiction of the wireless network 32.

Relative to native mobile subscribers for whom the wireless network 32 represents a home network (Home Network 1), service features may be provided by a packet data feature server 48 that acts as a local feature server. By way of example only, the feature server 48 may be implemented using the 7R/E Call Feature Server™ product from Lucent Technologies, Inc. Alternatively, feature service may be provided by a packet data feature server 50 that resides in another home network (Home Network 2) and which serves subscribers from multiple wireless networks (global feature server). By way of example only, the feature server 50 may be implemented using the Softswitch™ product from Lucent Technologies, Inc., which among other things, may be adapted to provide service logic to wireless terminals such as the wireless terminal 42.

A mobile subscriber for whom the wireless network 32 is a visited network will usually be provided service features from a packet data feature server located outside the wireless network 32. This can be done using the (global) feature server 50, or a (local) packet data feature server 52 (of like construction to the feature server 48), which is located in a wireless network 54 that is assumed to be the visiting mobile subscriber's home network (Home Network 3). If the packet data feature server 52 is used, it may be configured to access a conventional HLR (Home Location Registration) or HSS (Home Subscriber Server) 56 to obtain adjunct service feature information, as necessary.

With additional reference now to FIG. 3, assume by way of example that the mobile terminal 42 is visiting in the wireless network 32 from the wireless network 54. Assume further that a call origination or termination setup request is received at the MSC 34 or the M-IP/GPRS system 36 relative to the mobile terminal 42. This is shown as step 60 in FIG. 3. The call may be a voice call or a data call. To determine how to handle the call, the MSC 34 or the M-IP/GPRS system 36 ascertains the identity of the mobile terminal's feature server, as shown in step 62 of FIG. 3. This can be done using information provided from the mobile terminal 42 when it registers in the wireless network 32. Alternatively, if there is a global feature server used by many wireless networks, such as the feature server 50, the server's identity could be provisioned. In step 64 of FIG. 3, the MSC 34 or the M-IP/GPRS system 36 issues a service feature request to the identified feature server. Assuming for purposes of the present example that the feature server 52 is used, the service feature request is sent via the packet data network 44. The service feature request can be sent to the feature server 52 using any suitable protocol implemented by the packet data network 44 (e.g., TCP/IP). Preferably, the feature server 52 stores most or all of the wireless terminal's basic and supplemental service information. To be sure that this is the case, a test can be made by the feature server 52 in step 66. If additional information is required, the feature server 52 may consult the HLR/HSS 56, as shown in step 68 of FIG. 3. In step 70, the feature server 52 returns a feature service response to the MSC 34 or the M-IP/GPRS system 36 in the visited network 32.

If a local-specific service (e.g., emergency call or location service) is required, and it is the feature server 50 or 52 that receives the service feature request, the queried feature server may decide that the local feature server 48 in the visited network 32 should be used to control the service. This software-implemented decision is made in optional step 72 of FIG. 3. If the feature server 50 or 52 passes control, the feature server 48 will provide local service feature support in the visited network 32, as shown by optional step 74 in FIG. 3. Advantageously, the selection of which feature server to use can be performed on a per call basis.

Service feature logic is implemented in step 76. Although this processing is conventional for the most part, modifications need to be made to allow the wireless terminal 42 to exchange messages with the feature server that now implements the service feature logic instead of the MSC 34. If a voice call is involved and communication between the selected feature server and the wireless terminal 42 is required, the MSC 34 can be adapted to act as a relay point for signaling messages between these network endpoints due to its inherent ability to separate bearer traffic from signaling messages. If a data call is involved, there is no separate signaling channel and a data connection must be established between the wireless terminal 42 and the feature server. If the wireless terminal 42 needs to determine the network address of the feature server, the wireless terminal can be programmed to perform a DNS lookup at a conventional DNS host. Alternatively, the data terminal 40 can query the M-IP/GPRS system 36, which can be adapted to act as a special server that sets up the data connection to the feature server. Following connection establishment, the mobile terminal 42 and the feature server may converse as ordinary network connection end points.

Accordingly, novel system and method are disclosed for providing service features for wireless calls in a wireless telecommunication system that includes a packet data network. The disclosed system and method can provide a performance benefit relative to conventional systems wherein a VLR must be created and maintained during roaming. Advantageously, by providing service feature information dynamically to the visited network at call setup time, no VLR and service logic needs to be downloaded to the visited network at mobile registration time. Another advantage of the disclosed system and method is the ability to customize and manage subscriber features in a central location. Still further, the disclosed system and method provide service features for wireless data calls. While various embodiments of the invention have been disclosed, it should be apparent that many variations and alternative embodiments could be implemented in accordance with the invention. It is understood, therefore, that the invention is not to be in any way limited except in accordance with the spirit of the appended claims and their equivalents.

What is claimed is:

1. In a wireless telecommunication system, a method for providing service features for wireless calls without use of a VLR (Visitor Location Register), comprising the steps of:
    in response to a call to or from a wireless terminal situated in a host wireless communication network issuing a feature service request from said host wireless communication network into a public packet data network for administering service features for said wireless call to or from said wireless terminal;
    delivering said feature service request to a feature server located in a home network that is part of or reachable through said packet data network;
    said feature service request comprising a query of wireless subscriber service features provisioned on behalf of said wireless terminal and stored by said feature server; and
    returning a feature service response to said host wireless communication network and processing service feature information in said response without VLR storage thereof.

2. A method in accordance with claim 1 wherein said data network is the Internet.

3. A method in accordance with claim 1 wherein said method further includes said feature server consulting a home location register database in a home wireless communication network of said wireless terminal.

4. A method in accordance with claim 1 wherein said method further includes said feature server passing service feature control to a packet data feature server that is local to said host wireless communication network.

5. A method in accordance with claim 1 wherein said wireless call is a voice call.

6. A method in accordance with claim 1 wherein said wireless call is a data call.

7. A method in accordance with claim 1 wherein said home network is a wireless network.

8. A method in accordance with claim 1 wherein said home network is a wireless voice network.

9. In a wireless telecommunication system, a system for providing service features for wireless calls without use of a VLR (Visitor Location Register), comprising:
    a switch adapted to access a public packet data network in response to a call to or from a wireless terminal situated in a host wireless telecommunication network by issuing a feature service request into said packet data network for administering service features for said wireless call to or from said wireless terminal;
    a packet data feature server located in a home network that is part of or reachable through said packet data network and adapted to process said service feature request and manage service features for said wireless terminal;
    said feature service request comprising a query of wireless subscriber service features provisioned on behalf of said wireless terminal and stored by said feature server; and
    said feature server being further adapted to return a feature service response to said host wireless communication network and said switch being further adapted to process service feature information in said response without VLR storage thereof.

10. A system in accordance with claim 9 wherein said data network is the Internet.

11. A system in accordance with claim 9 wherein said home network is a home network associated with wireless terminals of plural wireless networks.

12. A system in accordance with claim 11 wherein said feature server is further adapted to consult a home location register database in a home wireless communication network of said wireless terminal.

13. A system in accordance with claim 11 wherein said feature server is further adapted to pass service feature control to a packet data feature server that is local to said host wireless communication network.

14. A system in accordance with claim 9 wherein said wireless call is a voice call.

15. A system in accordance with claim 9 wherein said wireless call is a data call.

16. A system in accordance with claim 9 wherein said home network is a wireless network.

17. A method for providing service features for wireless calls in a wireless telecommunication system without use of a VLR (Visitor Location Register), comprising the steps of:
in response to a call to or from a wireless terminal in a host wireless telecommunication network connected to a public packet data network, sending a service feature request from said host wireless telecommunication network across said packet data network to a packet data feature server adapted to administer service features for said wireless terminal; and
said feature service request comprising a query of wireless subscriber service features provisioned on behalf of said wireless terminal and stored by said feature server;
returning a service feature response to said host wireless communication network; and
processing service feature information in said response without VLR storage thereof.

18. A method in accordance with claim 17 wherein said feature server is located in a home network connected to said data network and is adapted to serve mobile subscribers in a single wireless network.

19. A method in accordance with claim 17 wherein said feature server is located in a home network connected to said data network and is adapted to serve mobile subscribers in multiple wireless networks.

20. In a data network feature server, a method for providing service features for wireless calls without use of a VLR (Visitor Location Register), comprising the steps of:
storing wireless subscriber service feature logic provisioned for a plurality of wireless terminals;
communicating service feature messages via a public data network with a switch located in a wireless network in response to a service feature request sent by said switch over said data network, said switch being in communication with a wireless terminal whose service feature logic is maintained by said feature server; and
communicating, as necessary, service feature messages via a data network with said wireless terminal without VLR storage thereof.

21. A method in accordance with claim 20 further including steps of determining whether additional service feature information is required for said wireless terminal, and obtaining such information from a service feature information resource that is in communication with said feature server.

22. A method in accordance with claim 20 further including steps of determining whether local feature service is required for said wireless terminal, and if so, passing service feature control to a local feature server associated with said wireless network.

23. A data network feature server for providing service features for wireless calls without use of a VLR (Visitor Location Register), comprising:
stored wireless subscriber service feature logic provisioned for a plurality of wireless terminals;
means for communicating service feature messages via a public data network with a switch located in a wireless network in response to a service feature request sent by said switch over said data network, said switch being in communication with a wireless terminal whose service feature logic is maintained by said feature server; and
means for communicating service feature messages via a data network with said wireless terminal without VLR storage thereof.

24. A data network feature server in accordance with claim 23 further including control programming adapted to determine whether additional service feature information is required for said wireless terminal, and to obtain such information from a service feature information resource that is in communication with said feature server.

25. A data network feature server in accordance with claim 23 further including control programming adapted to determine whether local feature service is required for said wireless terminal, and if so, to pass service feature control to a local feature server associated with said wireless network.

26. In a wireless network switch in a wireless network, a method for providing service features for wireless calls without use of a VLR (Visitor Location Register), comprising the steps of:
establishing a connection to a public data network;
establishing a connection to a wireless terminal;
in response to a call to or from said wireless terminal, sending a service feature request via said data network to a feature server located in a home network that is connected to or part of said data network;
said service feature request comprising a query of wireless subscriber service features provisioned on behalf of said wireless terminal and stored by said feature server; and
responding to service feature messages sent from said feature server without VLR storage thereof.

27. A method in accordance with claim 26 further including a step of assisting, as necessary, in the routing of service feature messages between said wireless terminal and said feature server via said data network.

28. A wireless network switch in a wireless network for providing service features for wireless calls without use of a VLR (Visitor Location Register), comprising:
means for communicating with a public data network;
means for communicating with a wireless terminal;
means responsive to a call to or from said wireless terminal for sending a feature service request via said data network to a feature server located in a home network that is connected to or part of said data network;
said feature service request comprising a query of wireless subscriber service features provisioned on behalf of said wireless terminal and stored by said feature server; and
means for responding to service feature messages from said feature server without VLR storage thereof.

29. A wireless network switch in accordance with claim 28 further including means for routing service feature messages, as necessary, between said wireless terminal and said feature server via said data network.

30. In a wireless terminal adapted for communication in a wireless network, a method for providing service features to said wireless terminal without use of a VLR (Visitor Location Register), comprising the step of:
   sending service feature messages to, and receiving service feature messages from, a data network feature server located in a home network that is connected to or part of a public data network, said service feature messages being sent to and received from said feature server via a switch in said wireless network;
   said feature service messages pertaining to wireless subscriber service features provisioned on behalf of said wireless terminal and stored by said feature server; and
   said feature service messages being processed without VLR storage of feature service information therein.

31. A method in accordance with claim 30 further including a step of establishing a data network connection with said feature server.

32. A method in accordance with claim 31 wherein said step of establishing a data network connection to said feature server includes performing a look-up of a data network address for said feature server.

33. A wireless terminal adapted for communication in a wireless network without use of a VLR (Visitor Location Register), comprising:
   a radio adapted to communicate over an air interface with a switch associated with said wireless network;
   means for sending service feature messages to, and receiving service feature messages from, a data network feature server located in a home network that is connected to or part of a public data network, said service feature messages being sent to and received from said feature server via said switch associated with said wireless network;
   said feature service messages pertaining to wireless subscriber service features provisioned on behalf of said wireless terminal and stored by said feature server; and
   said feature service messages being processed without VLR storage of feature service information therein.

34. A wireless terminal in accordance with claim 33 further including means for establishing a data network connection with said feature server.

35. A wireless terminal in accordance with claim 34 wherein said means for establishing a data network connection to said feature server includes means for performing a look-up of a data network address for said feature server.

* * * * *